(12) United States Patent
Pulicharla et al.

(10) Patent No.: US 11,588,938 B2
(45) Date of Patent: Feb. 21, 2023

(54) SYSTEMS AND METHODS FOR CURATION AND DELIVERY OF CONTENT FOR USE IN ELECTRONIC CALLS

(71) Applicant: Rovi Product Corporation, San Jose, CA (US)

(72) Inventors: Durga Prasad Pulicharla, Andhra Pradesh (IN); Madhusudhan Srinivasan, Bangalore (IN)

(73) Assignee: Rovi Product Corporation, San Jose, CA (US)

( * ) Notice: Subject to any disclaimer, the term of this patent is extended or adjusted under 35 U.S.C. 154(b) by 0 days.

(21) Appl. No.: 17/102,740

(22) Filed: Nov. 24, 2020

(65) Prior Publication Data

US 2021/0152690 A1    May 20, 2021

Related U.S. Application Data

(63) Continuation of application No. 16/143,238, filed on Sep. 26, 2018, now Pat. No. 10,880,433.

(51) Int. Cl.
| | |
|---|---|
| *H04M 3/48* | (2006.01) |
| *H04M 3/42* | (2006.01) |
| *H04M 3/487* | (2006.01) |
| *H04M 1/57* | (2006.01) |
| *H04M 1/72448* | (2021.01) |

(52) U.S. Cl.
CPC .......... *H04M 3/487* (2013.01); *H04M 1/576* (2013.01); *H04M 1/72448* (2021.01); *H04M 3/4211* (2013.01); *H04M 2203/2011* (2013.01)

(58) Field of Classification Search
CPC .. H04M 3/487; H04M 1/576; H04M 1/72563; H04M 3/4211; H04M 2203/2011; H04M 3/42102; H04M 3/42059; H04M 2242/28; H04M 1/72597; H04M 3/56; H04W 4/20; H04W 68/005; H04W 4/12; H04L 12/1831; H04L 12/1813; H04L 29/6414; H04L 51/10
See application file for complete search history.

(56) References Cited

U.S. PATENT DOCUMENTS

| | | | |
|---|---|---|---|
| 9,716,965 B2 | 7/2017 | Kim et al. | |
| 10,091,628 B2 | 10/2018 | Nirantar et al. | |
| 10,516,564 B2 | 12/2019 | Park | |
| 10,855,834 B2 * | 12/2020 | Pulicharla | ............... H04W 4/21 |
| 10,880,433 B2 * | 12/2020 | Pulicharla | ......... H04M 3/42042 |
| 11,263,492 B2 * | 3/2022 | Steiner | ................... G06V 10/75 |

(Continued)

*Primary Examiner* — Khawar Iqbal
(74) *Attorney, Agent, or Firm* — Lerner, David, Littenberg, Krumholz & Mentlik, LLP

(57) ABSTRACT

Systems and methods are described herein for a computer-based communication application that displays, along with an incoming call notification, content specific to the parties involved. The application identifies electronic records of events attended by the users, and retrieves content specific to those records. For example, the application may identify electronic mail or meeting notifications sent between the users and concerning a particular subject matter. Images related to that subject matter are then retrieved and displayed during calls between those users. Users are thus presented with customized and personalized content specific to the subject matter of each call, thus helping them better recognize callers and more readily engage with the call.

16 Claims, 7 Drawing Sheets

(56) References Cited

U.S. PATENT DOCUMENTS

| | | |
|---|---|---|
| 2007/0206733 A1 | 9/2007 | Bennett |
| 2013/0013683 A1* | 1/2013 | Elliott ................ H04L 51/10 |
| | | 709/204 |
| 2014/0321625 A1 | 10/2014 | Brown |
| 2015/0074559 A1 | 3/2015 | Garcia et al. |
| 2016/0094708 A1* | 3/2016 | Brown ................ H04M 15/61 |
| | | 455/566 |
| 2016/0219142 A1 | 7/2016 | Brown |
| 2016/0239547 A1* | 8/2016 | Lim .................... G06F 16/2358 |
| 2016/0294891 A1 | 10/2016 | Miller |
| 2016/0343034 A1 | 11/2016 | Green et al. |
| 2017/0032188 A1* | 2/2017 | Zhang ................ H04L 67/306 |
| 2017/0316616 A1 | 11/2017 | Malamud et al. |
| 2018/0059767 A1 | 3/2018 | Vaccari et al. |
| 2018/0129657 A1 | 5/2018 | Guest |
| 2018/0189894 A1 | 7/2018 | Hong et al. |
| 2018/0359347 A1 | 12/2018 | Kärkkäinen et al. |
| 2018/0367484 A1 | 12/2018 | Rodriguez et al. |
| 2019/0037172 A1 | 1/2019 | Choi et al. |
| 2019/0045335 A1 | 2/2019 | Jin et al. |
| 2019/0208053 A1 | 7/2019 | Nitidharmatut et al. |
| 2019/0260967 A1 | 8/2019 | Lyren |
| 2020/0077047 A1* | 3/2020 | Jeong ................ H04N 7/147 |
| 2020/0099782 A1 | 3/2020 | Pulicharla et al. |
| 2020/0099784 A1 | 3/2020 | Pulicharla et al. |
| 2020/0137225 A1* | 4/2020 | Nitidharmatut .... G06Q 30/0641 |
| 2020/0186641 A1* | 6/2020 | Ma ..................... G06F 3/017 |
| 2020/0228639 A1* | 7/2020 | He ..................... H04L 65/1016 |
| 2021/0227358 A1* | 7/2021 | Hong ................ H04W 4/16 |
| 2022/0263934 A1* | 8/2022 | Wang ................ G06V 40/174 |

* cited by examiner

SYSTEMS AND METHODS FOR CURATION AND DELIVERY OF CONTENT FOR USE IN ELECTRONIC CALLS

CROSS-REFERENCE TO RELATED APPLICATIONS

This application is a continuation of U.S. patent application Ser. No. 16/143,238, filed Sep. 26, 2018. The disclosure of which is hereby incorporated by reference herein in its entirety.

BACKGROUND

Embodiments of the disclosure relate generally to electronic calls. More specifically, embodiments of the disclosure relate to curation and delivery of content for use in electronic calls.

SUMMARY

Electronic communications between networked computational devices are increasingly commonplace. The ubiquitous nature of network-connected electronic devices allows communication to occur at almost any time, and in almost any location. Furthermore, as increasing numbers of these devices incorporate displays, cameras and microphones, voice and video calls are increasingly possible. Thus, for example, users can participate in mobile telephonic calls, as well as video and voice calls through a number of different and readily available applications. such applications allow calls on any electronic computing device, including desktop and laptop computers, as well as mobile communication devices such as smart phones. Additionally, many mobile communication devices contain built-in phone and messaging capability, allowing for both cellular telephonic calls and voice over internet protocol (VoIP) calls.

Each of these avenues for establishing communication channels between parties must still notify the parties of attempts to contact them, however. Current systems often fail in this regard. In particular, when implemented in computer systems, call notifications presented on computer displays are often inadequate, showing only a phone number or perhaps a name, with no graphical identification of the party. Furthermore, the subject of the call is often unknown to the party receiving the call. Thus, notifications presented on computer screens do not adequately inform users of the identity and intentions of the other party, and fail to engage users to a sufficient degree.

Accordingly, to overcome the deficiencies that exist when a computer system attempts to notify users of a call, systems and methods are described herein for a computer-based communication application that displays, along with an incoming call notification, content specific to the parties involved. More specifically, the application identifies electronic records of events attended by the users, and retrieves content specific to those records. For example, the application may identify electronic mail ("email") or meeting notifications sent between the users and concerning a particular subject. Images related to the subject matter are then retrieved and displayed during calls between those users. Users are thus presented with customized and personalized content specific to the subject matter of each call, thus helping them better recognize callers and more readily engage with the call.

The subject matter of a call can be determined according to various attributes of these electronic records. For example, a number of recent records may concern the same subject matter. Thus, when the electronic records are emails or meeting notifications sent between the parties to a call, and many of these emails or meeting notifications concern a particular subject, it may be deemed that this subject is likely the subject of a call between the parties.

Any attributes of these electronic records can be used to determine the subject matter. For instance, titles, subject lines, or any text in the body of such records may be employed. Any of these attributes may be scanned for terms that can be used to determine their subject matter. Additionally, any type of electronic records may be used. This includes records of previous calls between the users, meeting records including meeting notifications, meeting minutes and the like, and records of any documents exchanged between the users, including the documents themselves. Also included are any pictures containing both users, pictures exchanged between the users, or any other pictures of any events involving one or more users.

The electronic records may be any records of any events attended by the users, where such events may simply be any occurrence that users may be party to. Thus, the records may be records of meetings, phone calls, any activity engaged in by one or more users, or even records of the drafting of documents by one or more of the users.

The records may also be media including one or more users, i.e. any text, pictures, audio, or video of, or generated by, one or more users. When the electronic records are media, the subject matter of a call can be determined according to most recent media of one or more users. For instance, it may be determined that a call likely concerns the activity shown in the most recent picture containing both users. Content may also be chosen according to recency. That is, once the subject matter of the call is determined, content matching this subject matter may be selected according to how recently it was created or stored. Thus, newer and likely more relevant content may be displayed during calls.

Content may, however, be chosen according to other criteria besides recency. For example, content matching the likely subject matter of a call may be chosen according to whether it has yet been displayed to the parties to a call. That is, preference may be given to content not yet displayed to the parties, as this content may be new and more interesting to the parties. As another example, content may be chosen according to whether it was generated or created after the last call between the parties. In this manner, preference may be given to content created since the parties last called each other, as this content is also newer and thus more likely to be of interest to the parties.

It is noted that the determination of content for a call can be performed at any time, and in particular can be performed either before or after the call is initiated. Thus, for instance, content may be determined ahead of time, and stored for use whenever a call occurs. In this case, electronic records would indicate the likely subject matter of the next call between two users, with content determined accordingly and stored for use when the call occurs. The relevant content is then retrieved for display whenever the call is initiated. Conversely, the initiation of a call may trigger retrieval of electronic records and the corresponding determination of content. In this case, the likely subject matter of the call is not determined until after the call is initiated.

Systems and methods are also described herein for determining content to be displayed during a call between electronic devices. When a call is initiated between electronic devices, each device is electronically searched in order to identify electronic content common to both devices, and such common content is used for display during the call. In other words, content common to the devices involved in a call is displayed on each of those devices during the call. Such content is more likely to be the subject matter of the call, as well as being of common interest to the parties of the call. Display of such content thus informs the parties of the subject matter of the call, as well as likely increasing interest in and engagement with the call.

Common content may also be used to identify other content for display during the call. Like the above, such common content may be used to determine the likely subject matter of the call, and other content corresponding to this subject matter may be found for the call. The subject matter can be determined from this common content in any number of ways. As one example, metadata of the common content may include terms or other descriptors of subject matter, where other content having matching metadata descriptors can be identified and used for display during the call.

It should be noted that the call can be a call between more than two parties, such as a conference call or any other multi-party call. In this case, the common content can be any content stored on more than one device involved in the call. When the content is found on some but not all devices involved in a call, it can be transmitted to the other devices, so that all devices to a call display the same content even though this content did not originally reside on all devices. In this manner, content present on only some of the devices to a call can be shared to the remainder of the devices.

The various features described above can be employed in any combination, and utilized in any embodiment. For example, electronic records may be retrieved and used to determine the likely subject matter of a conference call, where the electronic records are found on less than all devices participating in the call.

BRIEF DESCRIPTION OF THE FIGURES

The above and other objects and advantages of the disclosure will be apparent upon consideration of the following detailed description, taken in conjunction with the accompanying drawings, in which like reference characters refer to like parts throughout, and in which.

DETAILED DESCRIPTION

In one embodiment, the disclosure relates to a system that automatically determines content to be displayed to users during and/or after the time in which an electronic call is being established. Upon detecting initiation of a call, the system automatically determines the likely subject matter of the call. Content is automatically retrieved corresponding to this subject matter, and displayed during and/or after call setup. In this manner, the system can display unique, subject-specific content for each different caller, that is relevant to both the caller and the callee, i.e., the person being called.

Figure 1:
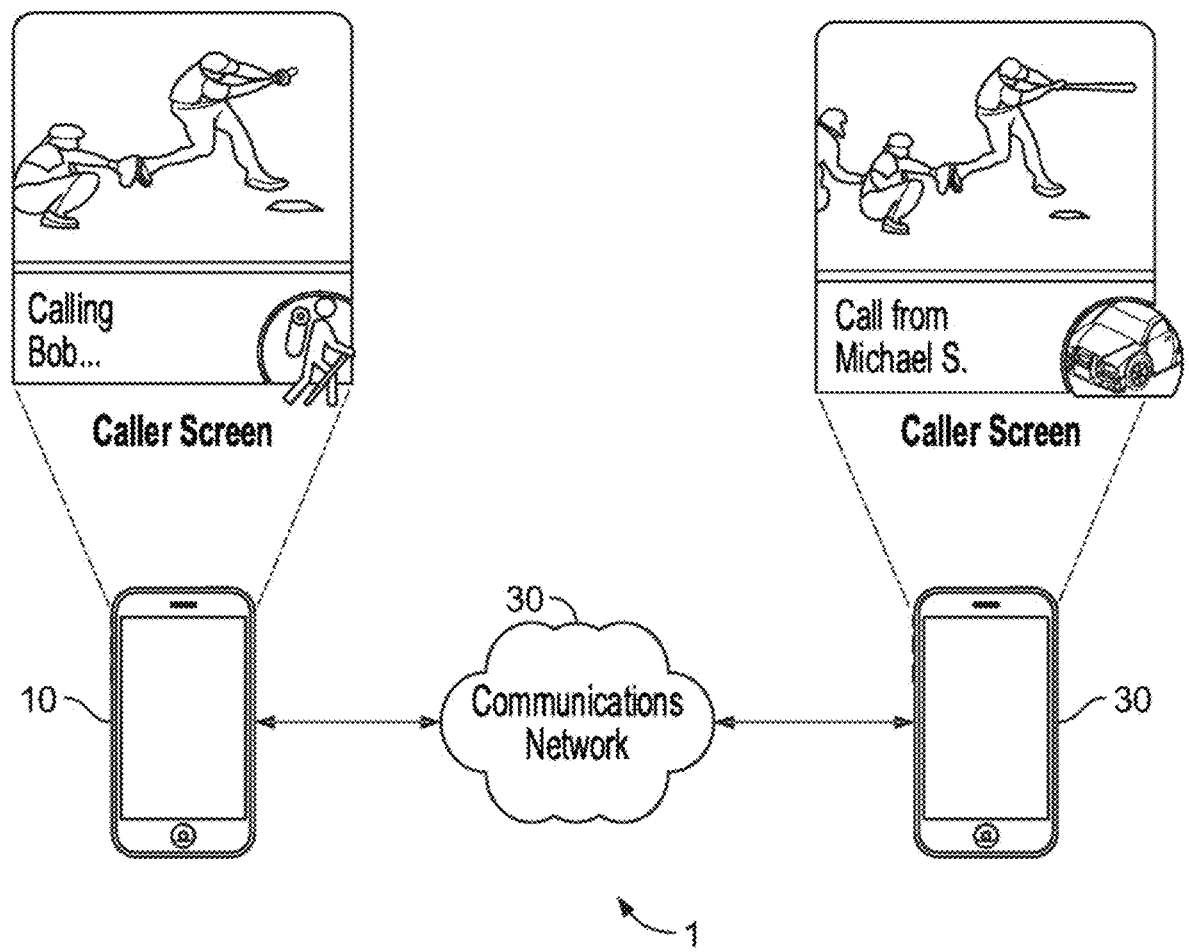
FIG. 1 illustrates operation of an exemplary electronic communication system according to embodiments of the disclosure.

FIG. 1 illustrates operation of an exemplary communication process according to embodiments of the disclosure. Here, a communication system 1 has a first computing device 10 and second computing device 20 that are in electronic communication through an electronic communication network 30. A first user at the first computing device 10 is attempting to place a call to a second user at the second computing device 20 through network 30. While the call is attempted, first computing device 10 displays the identity of the second user, i.e. the target of the call, as well as media relevant to the likely subject of the call between the first and second users. Similarly, second computing device 20 displays the identity of the first user, i.e. the calling party, as well as the same media.

As one example, system 1 may determine that the two users share a recent interest in baseball, or have attended a baseball game together recently. In response, system 1 may find a picture of that baseball game or simply a representative picture of their common interest, and display it for both parties as shown in FIG. 1. As another example, system 1 may also determine interests or other things that may serve as representations of the other party. Here for instance, system 1 may determine that the second user, "Bob", is an avid hiker, while the first user, "Michael S.", is an auto enthusiast. The system 1 may then retrieve representative pictures of each, and display them as a way to further identify the other party.

The first and second computing devices 10, 20 may be any computing devices capable of supporting an electronic communication channel, or call, between their respective users. For instance, the devices 10, 20 may be desktop, laptop, or tablet computers with monitors and microphones that can broadcast and/or display a call, or may be cellular phones with similar capabilities.

Figure 2:
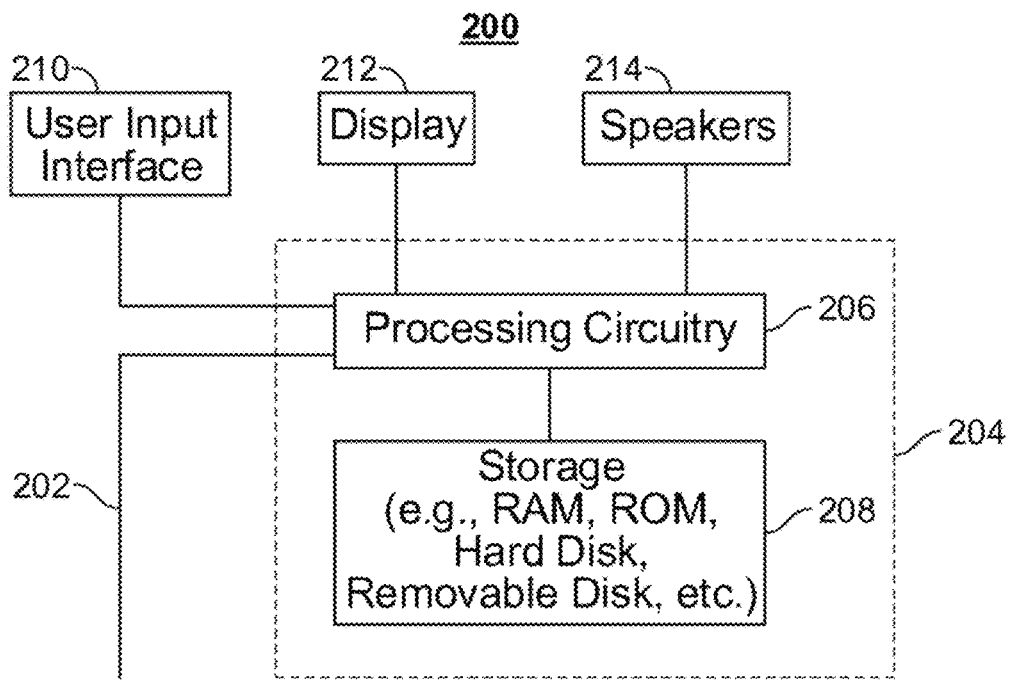
FIG. 2 is a generalized embodiment of an illustrative user equipment device constructed for use according to embodiments of the disclosure.

FIG. 2 shows a generalized embodiment of illustrative user equipment device 200. The first and second computing devices 10, 20 can each be a user equipment device 200. User equipment device 200 may receive content and data via input/output (hereinafter "I/O") path 202. I/O path 202 may provide content (e.g., broadcast programming, on-demand programming, Internet content, content available over a local area network (LAN) or wide area network (WAN), and/or other content) and data to control circuitry 204, which includes processing circuitry 206 and storage 208. Control circuitry 204 may be used to send and receive commands, requests, and other suitable data using I/O path 202. I/O path 202 may connect control circuitry 204 (and specifically processing circuitry 206) to one or more communications paths (described below). I/O functions may be provided by one or more of these communications paths, but are shown as a single path in FIG. 2 to avoid overcomplicating the drawing.

Control circuitry 204 may be based on any suitable processing circuitry such as processing circuitry 206. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 204 executes instructions for a media guidance application stored in memory (i.e., storage 208). Specifically, control circuitry 204 may be instructed by the media guidance application to perform the functions discussed above and below. For example, the media guidance application may provide instructions to control circuitry 204 to generate the media guidance displays. In some implementations, any action performed by control circuitry 204 may be based on instructions received from the media guidance application.

In client-server based embodiments, control circuitry 204 may include communications circuitry suitable for communicating with a guidance application server or other networks or servers. The instructions for carrying out the above-mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths. In addition, communications circuitry may include circuitry that enables peer-to-peer communication of user equipment devices, or communication of user equipment devices in locations remote from each other (described in more detail below).

Memory may be an electronic storage device provided as storage 208 that is part of control circuitry 204. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 208 may be used to store various types of content described herein as well as media guidance data described above. Nonvolatile memory may also be used (e.g., to launch a boot-up routine and other instructions). Cloud-based storage, described in relation to FIG. 3, may be used to supplement storage 208 or instead of storage 208.

Control circuitry 204 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 204 may also include scaler circuitry for upconverting and downconverting content into the preferred output format of the user equipment 200. Circuitry 204 may also include digital-to-analog converter circuitry and analog-to-digital converter circuitry for converting between digital and analog signals. The tuning and encoding circuitry may be used by the user equipment device to receive and to display, to play, or to record content. The circuitry described herein, including for example, the tuning, video generating, encoding, decoding, encrypting, decrypting, scaler, and analog/digital circuitry, may be implemented using software running on one or more general purpose or specialized processors. If storage 208 is provided as a separate device from user equipment 200, the tuning and encoding circuitry (including multiple tuners) may be associated with storage 208.

A user may send instructions to control circuitry 204 using user input interface 210. User input interface 210 may be any suitable user interface, such as a remote control, mouse, trackball, keypad, keyboard, touch screen, touchpad, stylus input, joystick, voice recognition interface, or other user input interfaces. Display 212 may be provided as a stand-alone device or integrated with other elements of user equipment device 200. For example, display 212 may be a touchscreen or touch-sensitive display. In such circumstances, user input interface 210 may be integrated with or combined with display 212. Display 212 may be one or more of a monitor, a television, a liquid crystal display (LCD) for a mobile device, active matrix display, cathode ray tube display, light-emitting diode display, organic light-emitting diode display, quantum dot display, or any other suitable equipment for displaying visual images. In some embodiments, display 212 may be HDTV-capable. In some embodiments, display 212 may be a 3D display, and the interactive media guidance application and any suitable content may be displayed in 3D.

A video card or graphics card may generate the output to the display 212. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 204. The video card may be integrated with the control circuitry 204. Speakers 214 may be provided as integrated with other elements of user equipment device 200 or may be stand-alone units. The audio component of videos and other content displayed on display 212 may be played through speakers 214. In some embodiments, the audio may be distributed to a receiver (not shown), which processes and outputs the audio via speakers 214.

Figure 3:
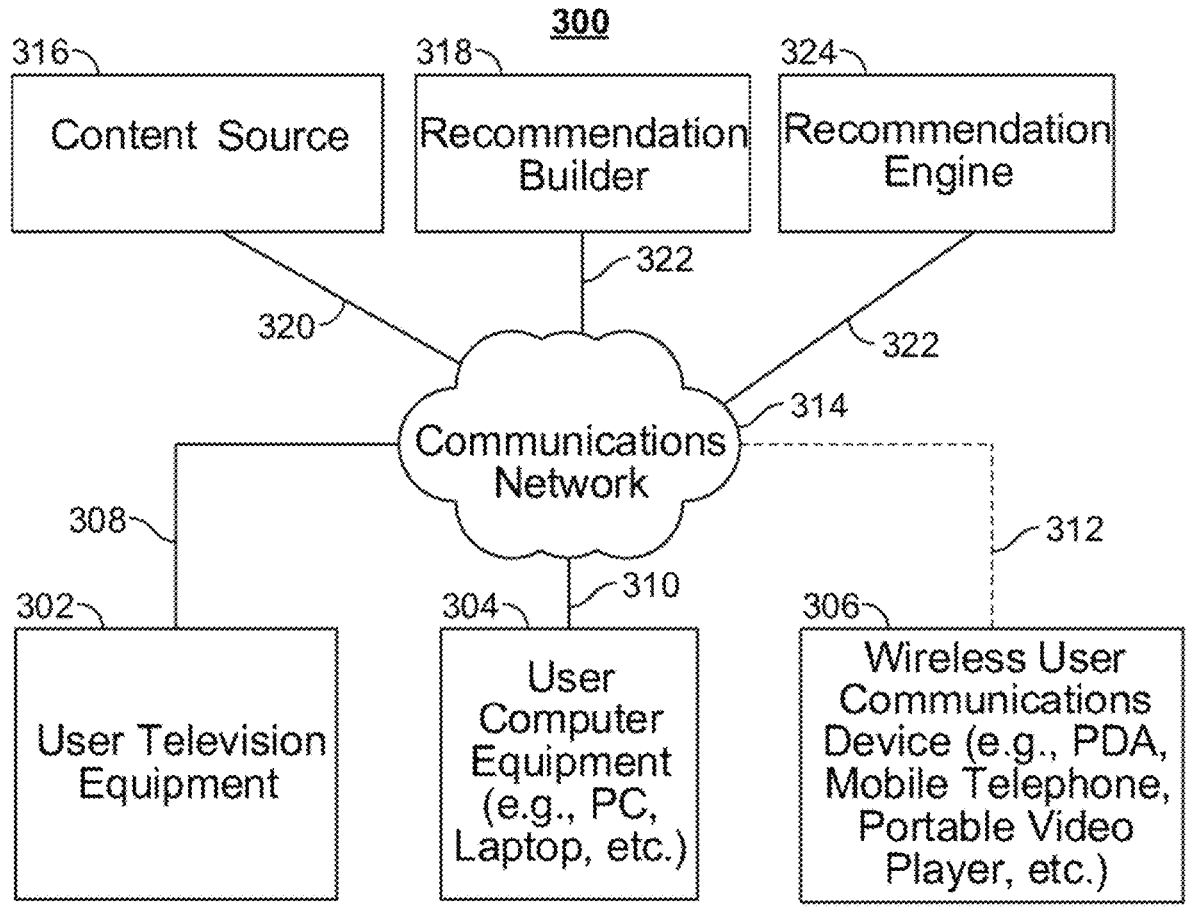
FIG. 3 is a block diagram representation of an exemplary electronic communication system according to embodiments of the disclosure.

User equipment device 200 of FIG. 2 can be implemented in system 300 of FIG. 3 as user television equipment 302, user computer equipment 304, wireless user communications device 306, or any other type of user equipment suitable for carrying an electronic call. User equipment devices may be part of a network of devices. Various network configurations of devices may be implemented and are discussed in more detail below.

In system 300, there is typically more than one of each type of user equipment device but only one of each is shown in FIG. 3 to avoid overcomplicating the drawing. In addition, each user may utilize more than one type of user equipment device and also more than one of each type of user equipment device.

The user equipment devices may be coupled to communications network 314. Namely, user television equipment 302, user computer equipment 304, and wireless user communications device 306 are coupled to communications network 314 via communications paths 308, 310, and 312, respectively. Communications network 314 may be one or more networks including the Internet, a mobile phone network, mobile voice or data network (e.g., a 4G or LTE network), cable network, public switched telephone network, or other types of communications network or combinations of communications networks. Paths 308, 310, and 312 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 312 is drawn with dotted lines to indicate that in the exemplary embodiment shown in FIG. 3 it is a wireless path and paths 308 and 310 are drawn as solid lines to indicate they are wired paths (although these paths may be wireless paths, if desired). Communications with the user equipment devices may be provided by one or more of these communications paths, but are shown as a single path in FIG. 3 to avoid overcomplicating the drawing.

Although communications paths are not drawn between user equipment devices, these devices may communicate directly with each other via communication paths, such as those described above in connection with paths 308, 310, and 312, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 314.

System 300 also includes content source 316, a recommendation building computer 318, and a recommendation engine computer 324. The content source 316 represents any computer-accessible source of content, such as a storage for the pictures shown in FIG. 1. The recommendation building computer 318 and recommendation engine computer 324 are in communication with each other, and with any of the devices 302, 304 and 306, through communications network 314.

Figure 4:
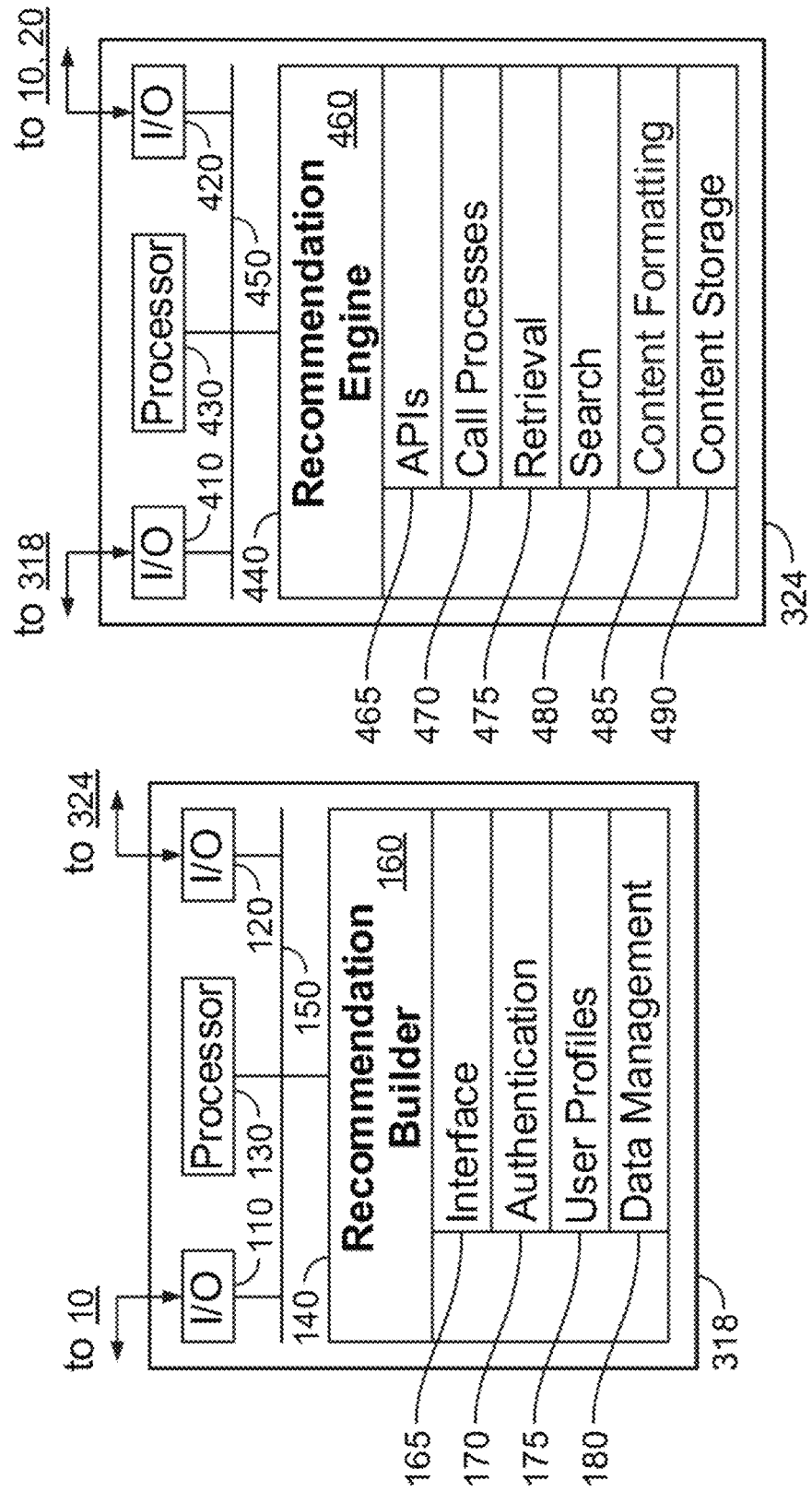
FIG. 4 is a generalized embodiment of electronic computers constructed to implement content curation and delivery operations of the disclosure.

FIG. 4 illustrates further details of recommendation building computer 318 and recommendation engine computer 324.

The recommendation building computer 318 is an electronic computer that has input/output (I/O) modules 110, 120 for transferring data to and from the computer 100. The recommendation building computer 100 also has a processor 130 and memory 140. The I/O modules 110, 120, processor 130, and memory 140 are each connected to, and communicate with each other through, a bus 150. As with device 200, the processor 130 and memory 140 may collectively be considered as control circuitry. In some embodiments, computer 318 may be in electronic communication with first computing device 10 and recommendation engine computer 200 through I/O modules 110 and 120, respectively.

The processor 130 executes programs stored in memory 140, including a recommendation builder module 160 which is a program for building and managing user profiles and transferring data. The recommendation builder module 160 contains a number of other programs or sub-modules, including an interface sub-module 165, an authentication sub-module 170, user profiles 175, and a data management sub-module 180. The interface sub-module 165 provides a user interface allowing users of first computing device 10 to interact with the various programs of the recommendation builder module 160. The authentication sub-module 170 is an authentication program that verifies the identity of users of first computing device 10, confirming that they have permission to operate the recommendation builder module 160. User profiles 175 store information on users of the first computing device 10 and each party that may either call, or be called from, first computing device 10, i.e. callers and callees using system 1. The information stored may aid in determining the subject matter of calls and retrieving content therefor, as further described below. Data management sub-module 180 transmits information, such as user profile information, to recommendation engine computer 324 to allow computer 324 to find content for display on first and second computing devices 10, 20 during a call setup process.

The recommendation engine computer 324 is an electronic computer similar in structure to recommendation builder computer 318. As with computer 318, recommendation engine computer 324 has I/O modules 410 and 420, a processor 430, and memory 440, all in communication with each other over bus 450. Each of these hardware elements 410-450 functions similar to corresponding elements 110-150 of recommendation builder computer 318. The processor 430 executes programs stored in memory 440, which include a recommendation engine 460. The recommendation engine 460 is a program configured to automatically search for content that can be displayed during calls between two users, and to store this content for retrieval during calls.

The recommendation engine 460 has a number of sub-modules, including application programming interfaces (APIs) 465 or other interfaces for communication with specified software applications. The recommendation engine 460 also includes call processes 470, a retrieval sub-module 475, search sub-module 480, content formatting sub-module 485, and content storage sub-module 490. The call processes 470 are routines for handling aspects of communication channels related to content display, e.g., transmitting content for display on first and second computing devices 10, 20 during calls. The retrieval sub-module 475 retrieves content from specified locations, such as from authorized storage and applications of the devices 10 and 20. The search sub-module 480 conducts electronic searches for content over networks such as communications network 30, according to search criteria from recommendation engine 460. The content formatting sub-module 285 converts retrieved content into a format suitable for display on screens of devices 10, 20 during calls. For example, content may be cropped or resized to fit within designated regions of the screens of computing devices 10, 20 (e.g., the bubbles containing icons in the caller and callee screens of FIG. 1), undesirable content may be removed, or the like. The content storage sub-module 490 stores content generated by the content formatting sub-module 485.

The recommendation building computer 318 and recommendation engine computer 324 respectively execute the recommendation builder 160 and recommendation engine 460 programs in order to display content during call setup, as in FIG. 1. As shown in FIG. 4, the recommendation building computer 318 and recommendation engine computer 324 are stand-alone computers in communication with the devices 10, 20 over communication network 30. However, one of ordinary skill in the art will recognize that the methods and processes of the disclosure can be carried out on any computational devices suitable for executing the recommendation builder 160 and recommendation engine 260 programs. For example, the computers 318, 324 may be servers located remote from the devices 10, 20. Alternatively, the recommendation builder 160 and recommendation engine 260 programs may also reside on, and be executed by, a single such server that may have the capacity to execute both. Further, the recommendation builder 160 and recommendation engine 260 programs may be resident on one or both of the devices 10, 20. Embodiments of the disclosure contemplate any number or configuration of digital computers for storing and executing the recommendation builder 160 and recommendation engine 260 programs and their associated data, located on or remote from devices 10, 20.

FIG. 4 illustrates a configuration in which modules and functionality of embodiments of the disclosure reside on computers 318 and 324 remote from the device 10 and 20. That is, content curation and storage are performed by an application located remote from devices 10 and 20, such as an application running on cloud servers. In this configuration, computers 318 and 324 may be cloud servers or components of one or more cloud servers, or may be one or more other computers located remote from devices 10 and 20. However, one of ordinary skill in the art will recognize that the modules and functionality of FIG. 2 may be resident in various computers besides the computers 318 and 324. For example, the various modules and sub-modules may reside locally on device 10, or the modules and sub-modules may be divided in any manner between device 10, device 20 or a remote server or computer such as one or more of computers 318 and 324.

One of ordinary skill in the art will also realize that calls between devices 10 and 20 may be performed in any manner. For example, communication channels may be VoIP calls between VoIP-enabled applications, may include audio and video, and devices 10, 20 may be any computers capable of supporting VoIP communication, such as desktop computers, laptop computers, or smartphones with VoIP applications installed. In this case, the communication channels may be peer to peer communications. Communications may be routed through computer 324 residing within communications network 30, which transmits content alongside the data of the communication channel. Alternately, device 10 may host communications through a separate application, and may for example subscribe to a different service offered by computers 318 and 324. This service would transmit content upon a request from the device 10 after device 10 detects an incoming communication channel through the separate application. In this manner, embodiments of the disclosure may be implemented to add content to peer to peer messaging applications such as mobile messaging applications residing on smartphones.

Figure 5:
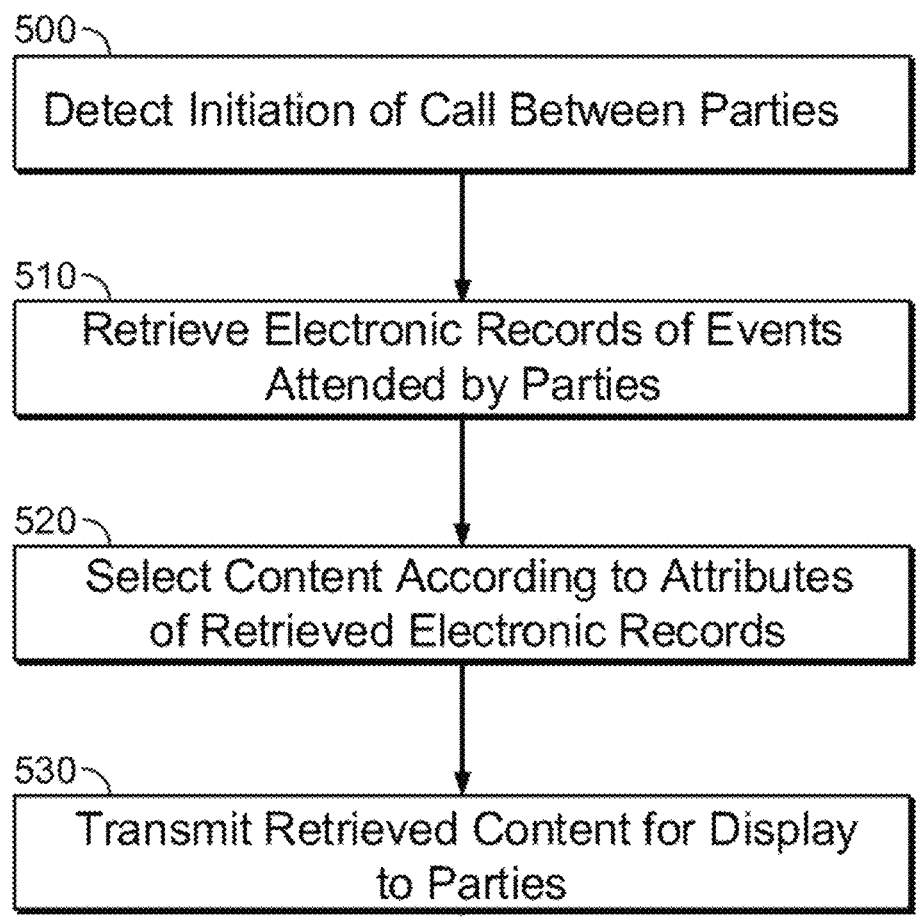
FIG. 5 is a flowchart illustrating process steps of content curation and delivery operations of an embodiment of the disclosure.

FIG. 5 illustrates operation of one embodiment of the system of FIGS. 2-4. Initially, the initiation of a call between parties is detected (Step 500). More specifically, the call process sub-module 470 of recommendation engine 460 detects a request to open an electronic call channel between two devices 10 and 20. The recommendation engine 460 then determines a likely subject matter of the call, by retrieving electronic records of events attended by the parties to the call (Step 510). To accomplish this step, the call process sub-module 470 first determines device identifiers of the parties to the detected call. For example, the call process sub-module 470 determines the internet protocol (IP) address of the device used by each party to the call. The retrieval sub-module 475 then accesses various electronic records on the device at each determined IP address, and these electronic records are used to determine a likely subject of the call.

The retrieval sub-module 475 may access those records for which it is given permission by users. Permitted devices and applications for each user may be stored in the user profiles 175 for those users. Prior to or during the call, users may issue permission through interface 165 to access their device, or specific applications thereon. Users may, for example, authorize recommendation builder 160 to access their email application and their photo directory, so that both emails and pictures may be accessed. The recommendation builder 160 would then retrieve emails and photos containing, e.g., both calling parties.

Next, the recommendation engine 460 selects content according to attributes of these retrieved electronic records (Step 520). More specifically, the electronic records may concern a particular subject, and it may be deemed that the subject of the electronic records is likely to be the subject of the call. The electronic records, their attributes, and how they are used to determine the likely subject of a call are described in further detail below.

Once content is selected, it is formatted for display by content formatting sub-module 485 and transmitted for display to the call parties (Step 530), where it is displayed to the parties during one or both of the call setup time and the call itself. The content may also be stored in storage 490 for use in later calls. Thus, system 300 automatically estimates the subject matter of an incoming call and displays content relevant to this subject matter, allowing users to more readily perceive the caller and likely subject of the call.

As above, the electronic records may be any records of any events attended by the users, where such events may simply be any occurrence that users may be party to. That is, they may be any records stored on any of the devices that are parties to a call, and may be any electronically stored description of any occurrence involving one or more parties to the call. For example, the electronic records can be emails or meeting invitations stored in an email application on one of the devices 10, 20. As another example, the records can also be call records listing the dates, times, and durations of prior calls between parties. The records can also take the form of documents or media that describe occurrences involving parties to a call, or that simply list such parties. For instance, the records can be any documents stored on any device 10, 20 that list each party to a call, or that list more than a predetermined number of call parties, e.g., a majority of the parties to the call, or the call originator plus one or more other parties.

The records can also be pictures stored on the devices 10, 20 and containing one or more parties to the call. The identities of parties can be determined from picture-based records in any manner, including by known software for identifying objects in a photo or video. Thus, for example, prior to or during the call, users may enter a photo of themselves via interface 165, where it is stored in their user profile 175. Alternatively, the search module 480 of recommendation engine 460 may retrieve a name or other identifying information from the user's profile 175, and search for a picture of the user. Once retrieved, the picture may be stored in user profile 175 for use in future calls.

Figure 6:
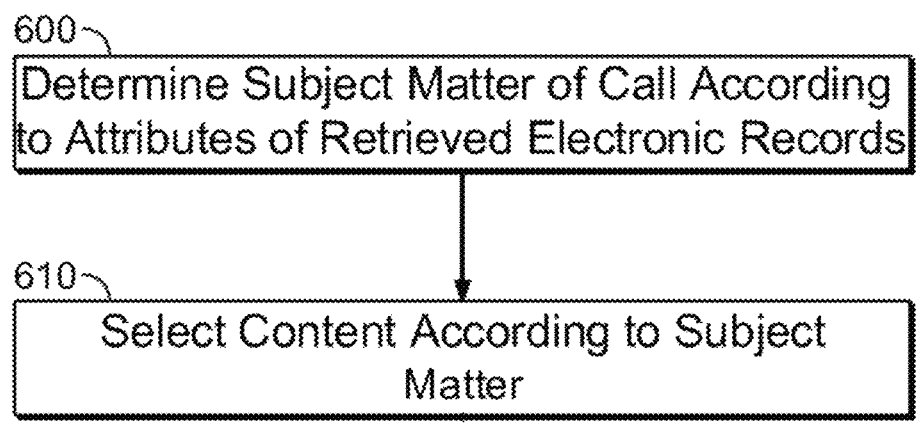
FIG. 6 is a flowchart illustrating process steps of subject matter determination and selection of corresponding content.

Attention now turns to determination of the subject matter of a call. FIG. 6 is a flowchart describing further details of one implementation of Step 520 of FIG. 5. Once electronic records are retrieved from the devices of the parties to a call as in Step 510 above, the recommendation engine 460 determines the subject matter of the call from attributes of the records (Step 600). Electronic records can be any descriptor of an event and one or more parties thereto, while attributes of these records are any information that characterizes the records. Examples of attributes include the title and text of an email record, the title and body of a meeting invitation, the parties to and duration of a call record, the people and items in a picture, words in the text of a document, or the like.

These attributes are used to estimate the likely subject matter of the next call. Embodiments of the disclosure contemplate subject matter estimation in any manner. In one embodiment, likely call subject matter is determined according to frequently found attributes or terms. Text terms of the electronic records are determined, and frequent terms inform the subject matter. For example, the subject matter may be deemed to be the most frequently used term, or the term that appears most often across the retrieved records. Subject matter may also be determined according to those terms which are more frequently found recently, i.e., terms which are most common in newer records. Additionally, subject matter may be weighted according to the number of call parties involved. For instance, preference may be given to those records that mention all calling parties involved, or multiple calling parties, and the subject matter can be determined from frequent terms that appear in those records.

Likely subject matter can also be determined using machine learning techniques, such as by automatically classifying the terms in records according to the topics identified (e.g., classifying the retrieved records as relating to a specific subject matter if a number of terms related to that subject matter appear), and/or by learning the subjects identified from a large sample of records. Classification of records by their associated terms is known, and various methods exist to accomplish this classification. Likewise, learning of associations between subjects and various text terms is also known, and various such learning methods exist. Embodiments of the disclosure contemplate use of any such methods.

Once the likely subject matter of an incoming call is determined, the recommendation engine 460 selects content according to this subject matter (Step 610). Content may be picked by subject matter in any manner. As one example, content corresponding to the determined subject matter can be selected from the devices of the calling parties. The retrieval sub-module 475 may check the user profiles 175 of the identified calling parties to determine the applications or portions of devices 10, 20 that it has permission to access. The permitted applications, or other portions of devices 10, 20 such as photo or other specified storages, are then accessed and content matching the estimated subject matter is retrieved. For instance, if the subject matter is determined to be baseball, the retrieval sub-module 475 analyzes the photos e.g., by the abovementioned object identification software or by metadata of the photos, and retrieves those photos related to baseball, or perhaps those photos having baseball items and one or more images of the calling parties. Alternatively, if the subject matter is determined to be a professional topic, e.g. a product name, the retrieval sub-module 475 may search for and retrieve content residing on the user device which contains that product name, the product name and the names of one or more calling parties, or the like.

As another example, content corresponding to the determined subject matter can be selected according to an electronic search. Here, search sub-module 480 may search any electronic content source 316 for content related to the determined subject matter. Content source 316 may be any searchable source of electronic content, such as databases, websites, content services, and the like. Searches may be performed using the identified subject matter as a search term, along with the calling parties' identifying information. That is, the search sub-module 480 may retrieve the calling parties' names or other identifying information from the corresponding user profiles 175, and enter that information as search terms along with the subject matter of the call.

As a further example, content corresponding to the determined subject matter can be selected from predetermined applications. For instance, when the subject matter is a professional matter, the applications may include proprietary or internal applications that require special permission to access, or certain specified formats for input/output. Popular applications, such as popular social media sites, are also contemplated. Thus, the recommendation engine 460 includes APIs 465 each configured to interface with a specific application. In operation, the recommendation engine 460 instructs each API 465 to search its particular application for content corresponding to the subject matter. The APIs 465 may retrieve any content, in any manner that seeks to retrieve content relevant to one or more party and the subject matter. For instance, the APIs 465 may retrieve content listing one or more of the parties and the subject matter, content in which one or more parties is tagged, documents authored by one or more parties, and the like. Any number of APIs 465 may be employed, for any number and type of applications.

It is likely that more content is retrieved than can be displayed during a call. For example, even if multiple pieces of content are retrieved, users may wish only a single image to be displayed during a call. Thus, content must often be selected for display from among a larger set of retrieved content. Embodiments of the disclosure contemplate selection in any manner. As one example, the recommendation engine 460 may select the most recent content, as determined by creation date, metadata indicating the date content was generated, posting date, or the like. Alternatively, the recommendation engine 460 may select content not yet displayed during a call. That is, displayed content may be assigned a flag indicating that it has already been displayed, and then stored in content storage 490. Upon the next call, retrieved content is then compared to that content stored in storage 490 which is flagged as already displayed. If a match is found, the content is not selected for display. Retrieved content which has not yet been displayed can then be chosen by any method, e.g., by the most recent content which has not yet been displayed. As another alternative, the recommendation engine 460 may select content which was generated after the last call between the parties. For example, user profiles 175 may store the dates and times of calls involving each user, where the date and time that the parties last called each other may be used as a cutoff time. Content generated, or otherwise having a date, after this cutoff date/time can then be selected for display during the current call.

It may be observed that the process of FIGS. 5-6 performs the steps of electronic record retrieval and content selection after the initiation of a call is detected. In other words, Steps 510 and 520 of FIG. 5 are shown as occurring after Step 500. However, the embodiments of the disclosure are not limited to this particular sequence. One of ordinary skill in the art will observe that Step 500 may be performed after Steps 510 and 520 have occurred. For example, users may access recommendation builder 160 ahead of time, and begin the process of content selection before a call occurs. The recommendation builder 160 would then set up profiles for the users and other parties the users may identify, whereupon the recommendation engine 460 retrieves records and selects content for the future call. Optionally, the recommendation engine 460 may periodically retrieve records and re-select content, which allows the system 300 to consistently display current content during calls.

In operation, the user may begin the content selection process by logging into the system 300 via interface 165.

The authentication sub-module 170 then authenticates the user, such as by username and password. After successful authentication, the interface 165 carries out a user profile setup process. Here, identifying information of the user is entered, such as the user's name and any other information that may be used in finding content. Users may also enter identifying information of other parties, so that user profiles of multiple individuals are created. Users can also enter photos of themselves or others, to allow the recommendation engine 460 to recognize people in photos.

Once profiles are complete, the data management sub-module 180 transmits relevant user information from the user profiles 175 to recommendation engine 460, whereupon recommendation engine 460 carries out Steps 510 and 520 as above, to determine content for calls between parties with known user profiles 175. Determined content for particular parties is stored in content storage 490, where it is retrieved when a call involving those parties occurs. In this manner, content can be collected and stored prior to a call, for more rapid access when calls occur.

Figure 7:
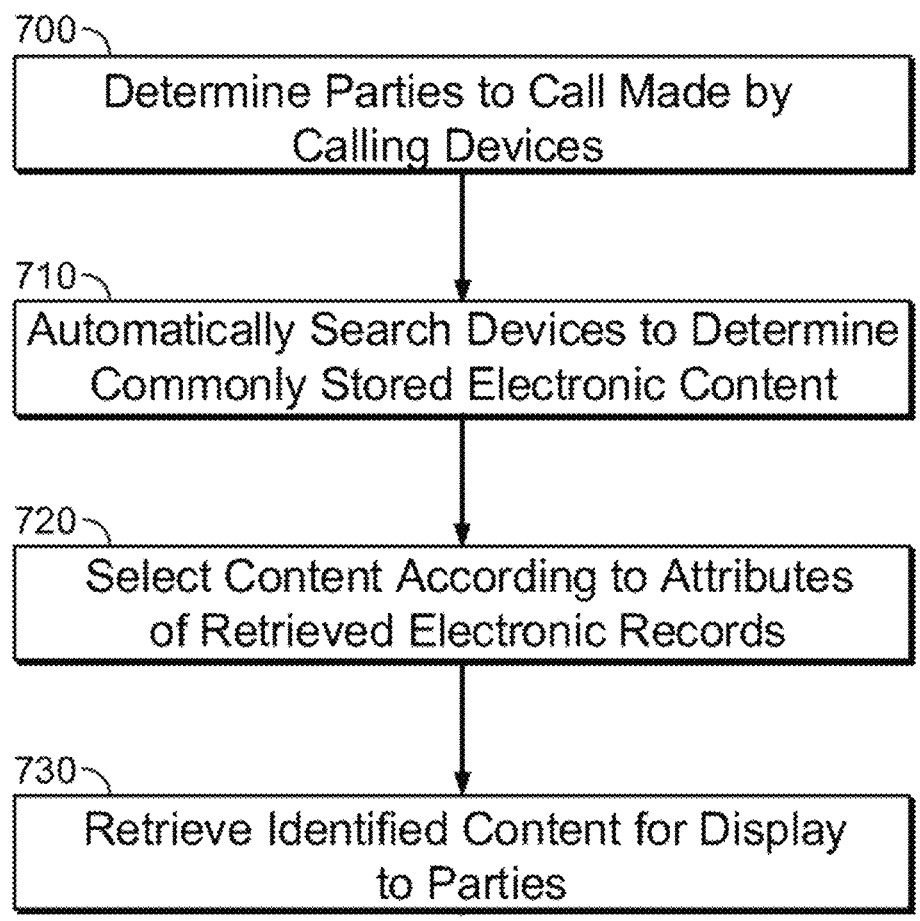
FIG. 7 is a flowchart illustrating process steps of content curation and delivery operations of another embodiment of the disclosure.

FIG. 7 is a flowchart illustrating process steps of content curation and delivery operations of another embodiment of the disclosure. Here, common content, or content stored on devices of every party to a call, is emphasized for display, as it may be deemed that a call between parties often concerns the subject matter of such common content.

First, the recommendation engine 460 determines the parties to a call made by calling devices (Step 700). This step may be performed in response to detection of an incoming call, as in Step 500 of FIG. 5. More than two parties to a call may exist, as in conference calls. Once the parties to a call are determined, the recommendation engine 460 automatically searches the devices of the parties to the call, to determine content common to every device involved in the call (Step 710). Content may be retrieved as above by retrieval sub-module 475, where an additional criterion for retrieval includes appearance on all devices involved in the call.

Retrieved content may be selected for display in any manner. Optionally, electronic records may be retrieved from the devices of parties to the call, and content is selected according to attributes of these records (Step 720). Electronic record retrieval and content selection can be performed as in previously described Steps 510 and 520. Again, it is noted that Step 720 is optional, and retrieved content can be selected for display in any other manner.

Selected content is then stored in content storage 490, where it is retrieved for display to the call parties during a call (Step 730). In this manner, selected content is transmitted to all parties during the call. This means that selected content found or identified on less than all devices involved in the call is transmitted to all such devices. That is, every device involved in the call sees such selected content during the call, even if the content resides on less than all devices. Additionally, if Steps 700-720 are performed after detection of call initiation, the identified content may not need to be stored in storage 490, but instead can simply be transmitted for display on the devices of the calling parties.

Figure 8:
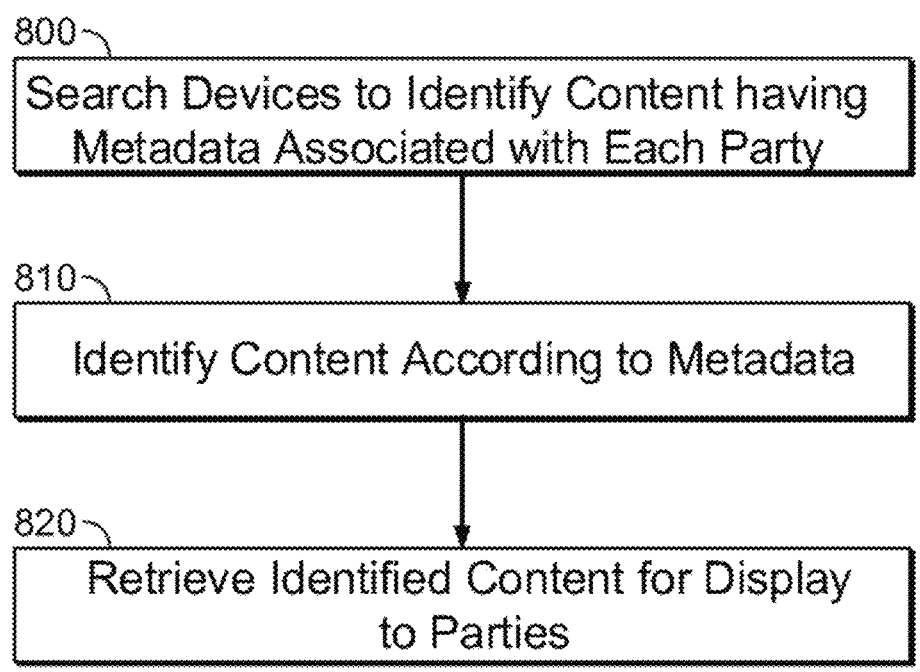
FIG. 8 is a flowchart illustrating process steps of content curation by metadata.

As above, common content can be selected for display in any other manner besides utilizing attributes of electronic records. One example is by use of content metadata. FIG. 8 illustrates one embodiment of content selection by metadata. After the parties to a call are determined, i.e. after Step 700 of FIG. 7, the retrieval sub-module 475 searches the devices of the parties to the call, to identify content having metadata associated with each party (Step 800). More specifically, content having metadata corresponding to every party to the call, such as documents authored by every calling party or photos with every party in them, is deemed more likely to describe the subject of the call, as it is content that every party has some association with.

This common content, or content having metadata of all call parties in common, can be selected for display. However, the present embodiment is not limited thereto, and such common content may also be used to identify other content for display instead. in this latter case, additional content is identified from the metadata of the content identified in Step 800 (Step 810). This is desirable when, for example, the common content identified in Step 800 is less desirable for display than other related content. For instance, the identified common content may be emails or a game schedule describing a baseball game attended by the call parties. It may not be desirable to display an email or a schedule during the call, and may instead be more desirable to display additional content, such as pictures of the baseball game.

Accordingly, content having metadata terms in common with the metadata of such common content can be deemed as likely being of the same subject matter as the common content, and can thus be selected for display. In this example, content may be selected according to the number of metadata terms in common. That is, content with the greatest number of common terms may be selected for display. However, embodiments of the disclosure contemplate content selection according to any method of metadata comparison. Selected content may then be stored in storage 490 if desired, where it is retrieved for display to the parties during the call (Step 820). As in other embodiments, if the content is selected after initiation of the call, such content may not necessarily be stored, and may simply be transmitted for display.

The foregoing description, for purposes of explanation, used specific nomenclature to provide a thorough understanding of the disclosure. However, it will be apparent to one skilled in the art that the specific details are not required to practice the methods and systems of the disclosure. Thus, the foregoing descriptions of specific embodiments of the present invention are presented for purposes of illustration and description. They are not intended to be exhaustive or to limit the invention to the precise forms disclosed. Many modifications and variations are possible in view of the above teachings. For example, content may be selected in any manner, whether by attributes of electronic records, by metadata, or any other method. Additionally, content selection can occur either prior to or after initiation of a call. The embodiments were chosen and described in order to best explain the principles of the invention and its practical applications, to thereby enable others skilled in the art to best utilize the methods and systems of the disclosure and various embodiments with various modifications as are suited to the particular use contemplated. Additionally, different features of the various embodiments, disclosed or otherwise, can be mixed and matched or otherwise combined so as to create further embodiments contemplated by the disclosure.

What is claimed is:

1. A method comprising:
    identifying, during a call, a first party and a second party to the call; searching a database of images to identify an image where both the first party and the second party are depicted;
    identifying an activity depicted in the identified image where both the first party and the second party are depicted;

selecting content based on the identified activity, determining whether the selected content has been previously displayed to the first party and the second party;

causing, in response to determining that the selected content has not been previously displayed to the first party and the second party, the selected content to be displayed on both a first device of the first party and a second device of the second party; and wherein determining whether the selected content has been previously displayed to the first party and the second party includes checking whether the selected content is assigned a flag indicating that it has already been displayed to the first user and the second user.

2. The method of claim 1, wherein the searching the database of images to identify the image where both the first party and the second party are depicted comprises searching the database of images to identify a most recent image among a plurality of images where both the first party and the second party are depicted.

3. The method of claim 1, wherein the image where both the first party and the second party are depicted is identified using image recognition.

4. The method of claim 1, wherein the image where both the first party and the second party are depicted is identified by comparing a first identifier of the first party and a second identifier of the second party to metadata associated with the images in the database of images.

5. The method of claim 1, wherein the causing the selected content to be displayed on both the first device of the first party and the second device of the second party comprises transmitting the selected content to the first device and the second device.

6. The method of claim 1, wherein the searching the database of images to identify the image where both the first party and the second party are depicted occurs after detecting an initiation of the call.

7. The method of claim 1, wherein the selecting content based on the identified activity comprises selecting content generated after an immediately previous call.

8. The method of claim 1, wherein the selected content based on the identified activity is an image depicting the identified activity.

9. A system comprising:

control circuitry configured to: identify during a call, a first party and a second party to the call;

search a database of images to identify an image where both the first party and the second party are depicted;

identify an activity depicted in the identified image where both the first party and the second party are depicted;

select content based on the identified activity;

determine whether the selected content has been previously displayed to the first party and the second party; and prepare, in response to determining that the selected content has not been previously displayed to the first party and the second party, the selected content for display;

communication circuitry configured to cause the selected content prepared for display to be displayed on both a first device of the first party and a second device of the second party; and wherein determining whether the selected content has been previously displayed to the first party and the second party includes checking whether the selected content is assigned a flag indicating that it has already been displayed to the first user and the second user.

10. The system of claim 9, wherein the control circuitry is further configured, when searching the database of images to identify the image where both the first party and the second party are depicted, to search the database of images to identify a most recent image among a plurality of images where both the first party and the second party are depicted.

11. The system of claim 9, wherein the control circuitry is further configured, when identifying the image where both the first party and the second party are depicted, to use image recognition to identify the image.

12. The system of claim 9, wherein the control circuitry is further configured, when identifying the image where both the first party and the second party are depicted, to compare a first identifier of the first party and a second identifier of the second party to metadata associated with the images in the database of images.

13. The system of claim 9, wherein the communication circuitry is further configured, when causing the selected content to be displayed on both the first device of the first party and the second device of the second party, to transmit the selected content to the first device and the second device.

14. The system of claim 9, wherein the control circuitry is further configured to search the database of images to identify the image where both the first party and the second party are depicted after detecting an initiation of the call.

15. The system of claim 9, wherein the control circuitry is further configured, when selecting content based on the identified activity, to select content generated after an immediately previous call.

16. The system of claim 9, wherein the selected content based on the identified activity is an image depicting the identified activity.

* * * * *